(12) United States Patent
Singer

(10) Patent No.: US 9,727,915 B2
(45) Date of Patent: Aug. 8, 2017

(54) METHODS AND APPARATUS TO IMPLEMENT SPIN-GESTURE BASED TRADE ACTION PARAMETER SELECTION

(71) Applicant: Trading Technologies International, Inc., Chicago, IL (US)

(72) Inventor: Scott F. Singer, Lake Bluff, IL (US)

(73) Assignee: Trading Technologies International, Inc., Chicago, IL (US)

( * ) Notice: Subject to any disclaimer, the term of this patent is extended or adjusted under 35 U.S.C. 154(b) by 114 days.

(21) Appl. No.: 14/038,435

(22) Filed: Sep. 26, 2013

(65) Prior Publication Data

US 2015/0088722 A1    Mar. 26, 2015

(51) Int. Cl.
  *G06Q 40/04* (2012.01)
  *G06F 3/0487* (2013.01)
  *G06F 3/0488* (2013.01)

(52) U.S. Cl.
  CPC ......... *G06Q 40/04* (2013.01); *G06F 3/04883* (2013.01)

(58) Field of Classification Search
  CPC ...... G06Q 40/04; G06F 3/0487; G06F 3/0488
  USPC ...................................... 705/37, 35
  See application file for complete search history.

(56) References Cited

U.S. PATENT DOCUMENTS

| | | | |
|---|---|---|---|
| 5,612,719 A | 3/1997 | Beernink et al. | |
| 6,154,723 A * | 11/2000 | Cox et al. | 704/270 |
| 6,311,214 B1 * | 10/2001 | Rhoads | 709/217 |
| 6,317,132 B1 * | 11/2001 | Perlin | 345/475 |
| 6,772,132 B1 | 8/2004 | Kemp, II et al. | |
| 7,546,550 B1 | 6/2009 | Buck | |
| 7,554,530 B2 | 6/2009 | Mizobuchi et al. | |
| 7,559,036 B1 | 7/2009 | Buck | |
| 7,580,883 B2 | 8/2009 | Borts | |
| 8,027,908 B2 | 9/2011 | Borts | |
| 8,037,422 B1 | 10/2011 | Buck | |
| 8,174,503 B2 | 5/2012 | Chin | |
| 8,201,109 B2 | 6/2012 | Van Os et al. | |
| 8,416,217 B1 | 4/2013 | Eriksson et al. | |
| 8,442,890 B2 * | 5/2013 | Brumfield et al. | 705/36 R |
| 8,587,519 B2 * | 11/2013 | Shaw et al. | 345/158 |

(Continued)

FOREIGN PATENT DOCUMENTS

| | | |
|---|---|---|
| EP | 2060970 A1 | 5/2009 |
| FR | 2985583 A1 * | 1/2012 |
| RU | 2439653 C2 * | 1/2012 |

OTHER PUBLICATIONS

International Search Report and Written Opinion of International Application No. PCT/US2014/068783, dated Jan. 29, 2015 (mailed Mar. 3, 2015).

*Primary Examiner* — Jagdish Patel
(74) *Attorney, Agent, or Firm* — McDonnell Boehnen Hulbert & Berghoff LLP

(57) ABSTRACT

Methods and apparatus to implement spin-gesture based trade action parameter selection are disclosed herein. An example method includes detecting, via a user interface of a trading application generated by a computing device, an activation event associated with an interface control corresponding to a trade action, wherein the activation event is a gestural input received via the generated user interface. The example method also includes updating, via the user interface, a value of a trade action parameter associated with the trade action, wherein the value of the trade action parameter updates in a sequence based on a direction associated with the gestural input.

20 Claims, 7 Drawing Sheets

(56) References Cited

U.S. PATENT DOCUMENTS

| | | |
|---|---|---|
| 8,620,794 B2 | 12/2013 | Borts |
| 8,713,478 B2 | 4/2014 | Buck |
| 9,268,966 B1 | 2/2016 | Amacker et al. |
| 2004/0246240 A1* | 12/2004 | Kolmykov-Zotov et al. ............ 345/179 |
| 2005/0004852 A1 | 1/2005 | Whitney |
| 2005/0089225 A1* | 4/2005 | Chang et al. ............ 382/181 |
| 2006/0026536 A1 | 2/2006 | Hotelling et al. |
| 2006/0129475 A1 | 6/2006 | Badenhorst et al. |
| 2006/0284893 A1 | 12/2006 | Hlad et al. |
| 2007/0139370 A1* | 6/2007 | Lu et al. ............ 345/156 |
| 2007/0150401 A1 | 6/2007 | Brucato et al. |
| 2007/0152984 A1* | 7/2007 | Ording et al. ............ 345/173 |
| 2007/0156565 A1 | 7/2007 | Singer et al. |
| 2007/0156570 A1* | 7/2007 | Singer et al. ............ 705/37 |
| 2008/0025645 A1 | 1/2008 | Jakobson et al. |
| 2008/0117168 A1* | 5/2008 | Liu et al. ............ 345/158 |
| 2009/0027338 A1* | 1/2009 | Weinberg et al. ............ 345/158 |
| 2010/0020035 A1 | 1/2010 | Ryu et al. |
| 2010/0042954 A1 | 2/2010 | Rosenblatt et al. |
| 2010/0269040 A1 | 10/2010 | Lee |
| 2010/0283742 A1* | 11/2010 | Lam ............ 345/173 |
| 2010/0289754 A1* | 11/2010 | Sleeman et al. ............ 345/173 |
| 2010/0306693 A1 | 12/2010 | Brinda |
| 2010/0333195 A1 | 12/2010 | Wang |
| 2011/0080351 A1 | 4/2011 | Wikkerink et al. |
| 2011/0088086 A1 | 4/2011 | Swink et al. |
| 2011/0112952 A1 | 5/2011 | Annunziata et al. |
| 2011/0138275 A1 | 6/2011 | Yu |
| 2011/0256848 A1 | 10/2011 | Bok et al. |
| 2011/0310041 A1* | 12/2011 | Williams et al. ............ 345/173 |
| 2012/0005059 A1* | 1/2012 | Buck ............ 705/37 |
| 2012/0046079 A1 | 2/2012 | Kim et al. |
| 2012/0068950 A1* | 3/2012 | Conde et al. ............ 345/173 |
| 2012/0079586 A1 | 3/2012 | Brown et al. |
| 2012/0089948 A1 | 4/2012 | Lim et al. |
| 2012/0123558 A1* | 5/2012 | Gill ............ 623/24 |
| 2012/0176401 A1* | 7/2012 | Hayward et al. ............ 345/619 |
| 2012/0182226 A1 | 7/2012 | Tuli |
| 2012/0233571 A1 | 9/2012 | Wever et al. |
| 2012/0275648 A1* | 11/2012 | Guan ............ 382/103 |
| 2012/0284297 A1 | 11/2012 | Aguera-Arcas et al. |
| 2012/0284673 A1 | 11/2012 | Lamb et al. |
| 2012/0284789 A1 | 11/2012 | Kim et al. |
| 2012/0317509 A1* | 12/2012 | Ludwig et al. ............ 715/781 |
| 2013/0007666 A1 | 1/2013 | Song et al. |
| 2013/0063380 A1 | 3/2013 | Wang et al. |
| 2013/0093705 A1* | 4/2013 | Huang ............ 345/173 |
| 2013/0093707 A1 | 4/2013 | Park et al. |
| 2013/0111379 A1 | 5/2013 | Hong et al. |
| 2013/0113714 A1 | 5/2013 | Mao |
| 2013/0159927 A1 | 6/2013 | Chuang et al. |
| 2013/0162513 A1* | 6/2013 | Ronkainen ............ 345/156 |
| 2013/0167074 A1 | 6/2013 | Oonishi et al. |
| 2013/0169549 A1 | 7/2013 | Seymour et al. |
| 2013/0283215 A1 | 10/2013 | Sundaramurthy et al. |
| 2013/0297474 A1 | 11/2013 | Creamer et al. |
| 2013/0311955 A9 | 11/2013 | de Leon |
| 2013/0312083 A1 | 11/2013 | Farraro et al. |
| 2014/0035843 A1 | 2/2014 | Zo et al. |
| 2014/0055235 A1 | 2/2014 | Choi |
| 2014/0085271 A1* | 3/2014 | Hwang et al. ............ 345/179 |
| 2014/0085460 A1 | 3/2014 | Park et al. |
| 2014/0143785 A1* | 5/2014 | Mistry et al. ............ 718/104 |
| 2014/0157209 A1* | 6/2014 | Dalal et al. ............ 715/863 |
| 2014/0229359 A1 | 8/2014 | Borts |
| 2014/0253461 A1 | 9/2014 | Hicks et al. |
| 2014/0279344 A1 | 9/2014 | Creamer et al. |
| 2015/0029225 A1 | 1/2015 | Aigner |
| 2015/0081502 A1 | 3/2015 | Singer |
| 2015/0082252 A1 | 3/2015 | Chaudhri et al. |
| 2015/0088722 A1 | 3/2015 | Singer |
| 2015/0160788 A1 | 6/2015 | Sun et al. |
| 2015/0186028 A1 | 7/2015 | Singer et al. |

* cited by examiner

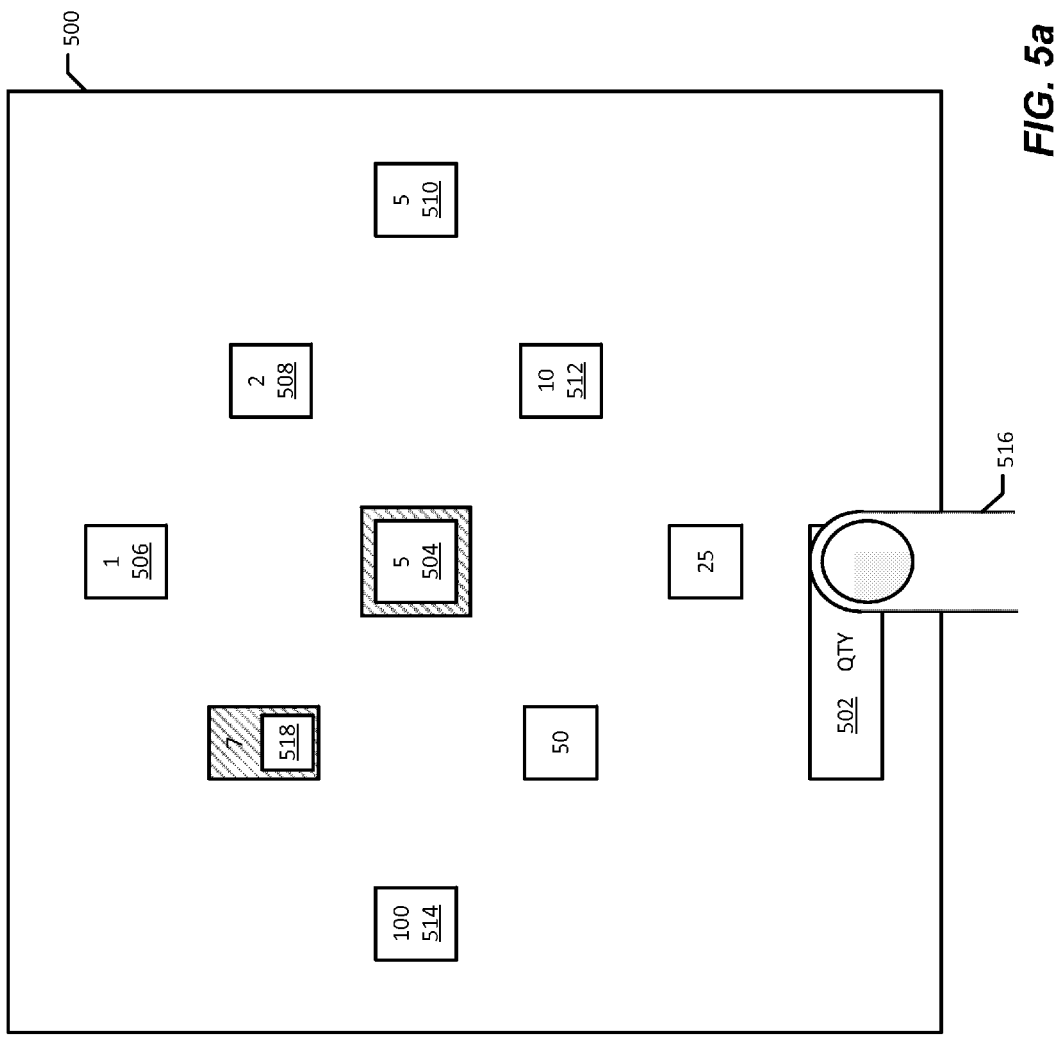

METHODS AND APPARATUS TO IMPLEMENT SPIN-GESTURE BASED TRADE ACTION PARAMETER SELECTION

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

Advances in mobile devices have resulted in improved touch screens that allow users to directly interact with what is displayed. For example, a user may play a game, write an email, file taxes, etc., by directly interacting with the user interface of the touch screen, rather than using an intermediary device such as a mouse, keyboard, touchscreen, etc.

BRIEF DESCRIPTION OF THE FIGURES

Certain embodiments are disclosed with reference to the following drawings.

FIGS. 5a and 5b illustrate an example trading window in accordance with disclosed embodiments.

Figure 1:
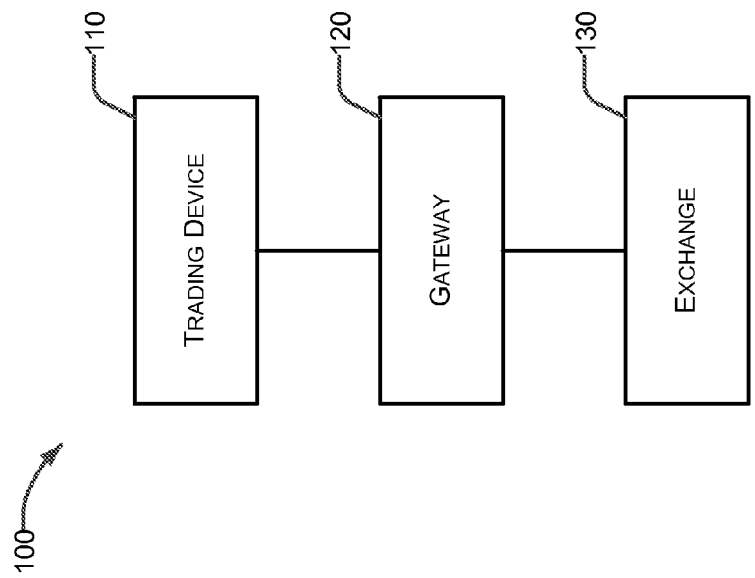
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

This disclosure relates generally to electronic trading environments and, more particularly, to methods and apparatus to implement spin-gesture based trade action execution.

In general, users desire to be able to react more quickly than other market participants. For example, market participants (or traders or other users) generally desire to be "first-to-market" (e.g., have orders entered prior to other market participants entering the same or similar orders). It is therefore advantageous to optimize the manner in which market data is displayed to the user and to allow the user to make fast and accurate order entry. The slightest speed advantage may give a user a significant competitive advantage.

Trading applications allow users to initiate trade actions. In some examples, a trading application may include trading windows for displaying market data or a portion of the market data. In addition, the trading windows may include trade action controls for initiating or executing trade actions. A trade action control is a button, cell, or area on a trading screen that corresponds to a particular trade action. In some examples, when the trade action control is enabled, the trading device may execute or perform the corresponding trade action, such as placing, cancelling or changing a trade order.

Touch screens allow users to directly or indirectly interact with the trading application. In some examples, a user operates (e.g., executes) the trading application by directly interacting with the components displayed via the touch screen. For example, a user may execute a trade action (e.g., communicate a sell order, a buy order, etc.) by directly selecting a trade action control (e.g., a button) corresponding to the trade action. Directly interacting with the trading application may be useful in that it eliminates (or nearly eliminates) the need for additional components to execute trade actions (e.g., using a computer mouse to select a trade action control). As a result, trade actions may be executed more efficiently by the user. Although touch screens allow for relatively quicker direct interaction, removing a physical keyboard results in limiting the number of dedicated direct-inputs of trade action parameters such as order quantity.

Embodiments disclosed herein recognize that screen real-estate is limited on a touch screen and, thus, the number and types of inputs are limited. Unlike prior trading systems, embodiments disclosed herein implement spin-gesture based trade action parameter selection by overlaying temporary user interface elements (e.g., buttons, cells, etc.) that may be manipulated by spinning a user finger across the touch screen to change trade action parameter values. According to embodiments disclosed herein, the trade action parameter values would rotate based on the direction of the spin-gesture.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Certain embodiments provide a method including detecting, via a user interface of a trading application generated by a computing device, an activation event associated with an interface control corresponding to a trade action, wherein the activation event is a gestural input received via the generated user interface. The example method also includes updating, via the user interface, a value of a trade action parameter associated with the trade action, wherein the value of the trade action parameter updates in a sequence based on a direction associated with the gestural input.

Certain embodiments provide an apparatus including a user interface rendering module to generate a user interface of a trading application that is to include an interface control, wherein the interface control is to correspond to a trade action. The example apparatus also includes an activation event detecting module to detect an activation event associated with the interface control, wherein the activation event is a gestural input. The example apparatus also includes a sequencing module to update a value of a trade action parameter associated with the trade action based on the gestural input.

Certain embodiments provide a tangible computer readable storage medium including computer program code to be executed by a processor, the computer program code, when executed, to implement a method. The example computer program code also includes the method detecting, via a user interface of a trading application, an activation event associated with an interface control corresponding to a trade action, wherein the activation event is a gestural input received via the generated user interface. The example computer program code also includes the method updating, via the user interface, a value of a trade action parameter associated with the trade action, wherein the value of the trade action parameter updates in a sequence based on a direction associated with the gestural input.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order, etc. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals and to exclude transmission media.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or un-requested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a user may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
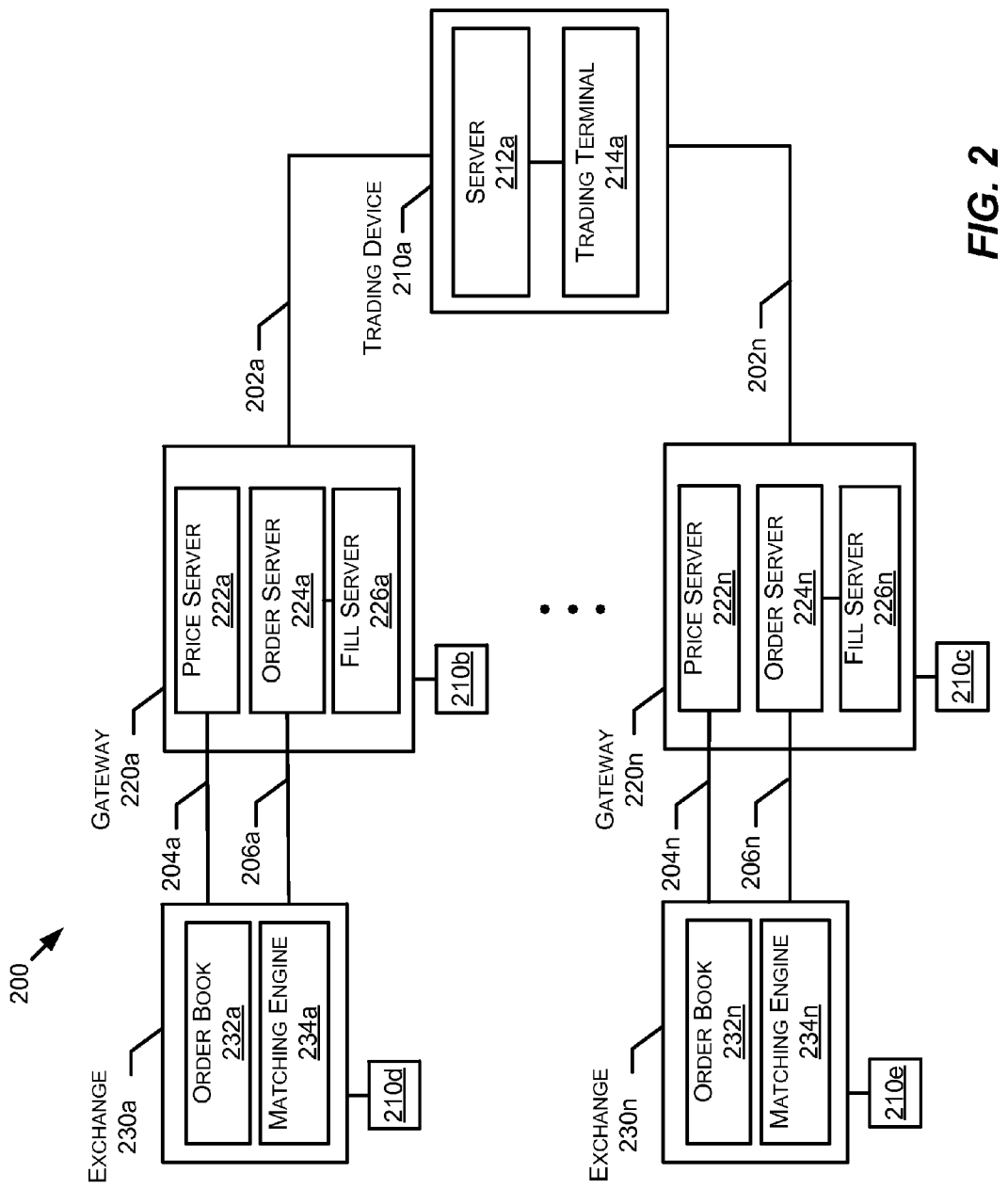
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradeable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks. For example, as shown in FIG. 2, there may be two communication networks connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. Example Computing Device

Figure 3:
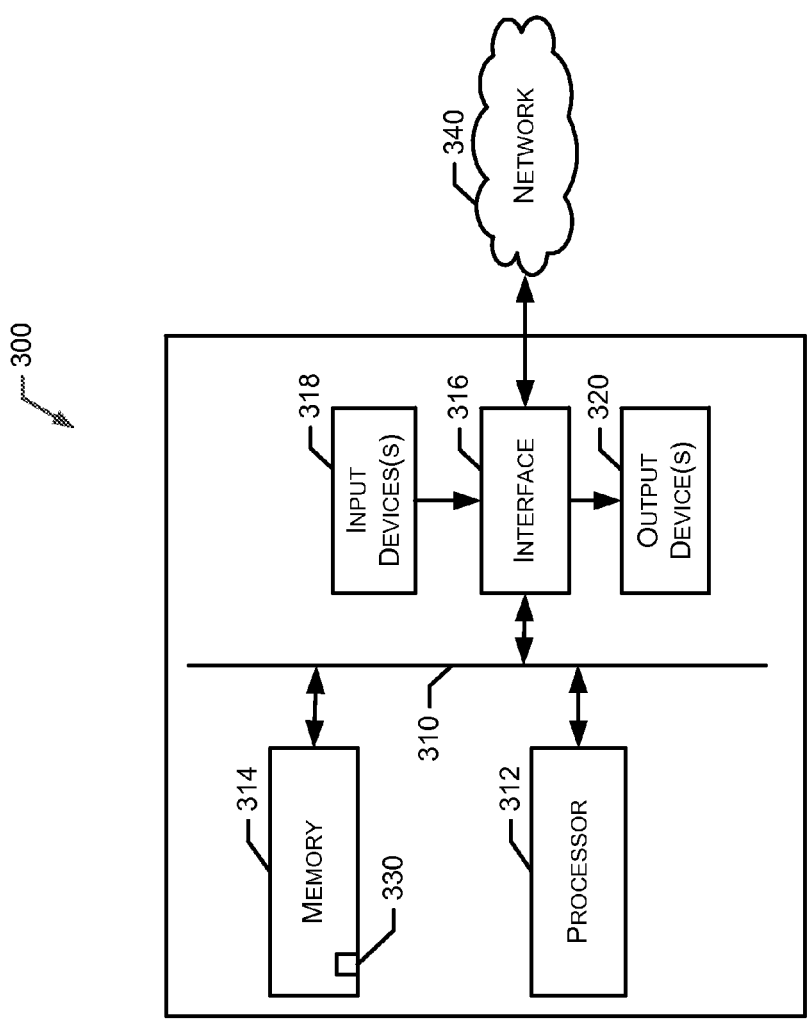
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 and/or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals and to exclude transmission media. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

Figure 4:
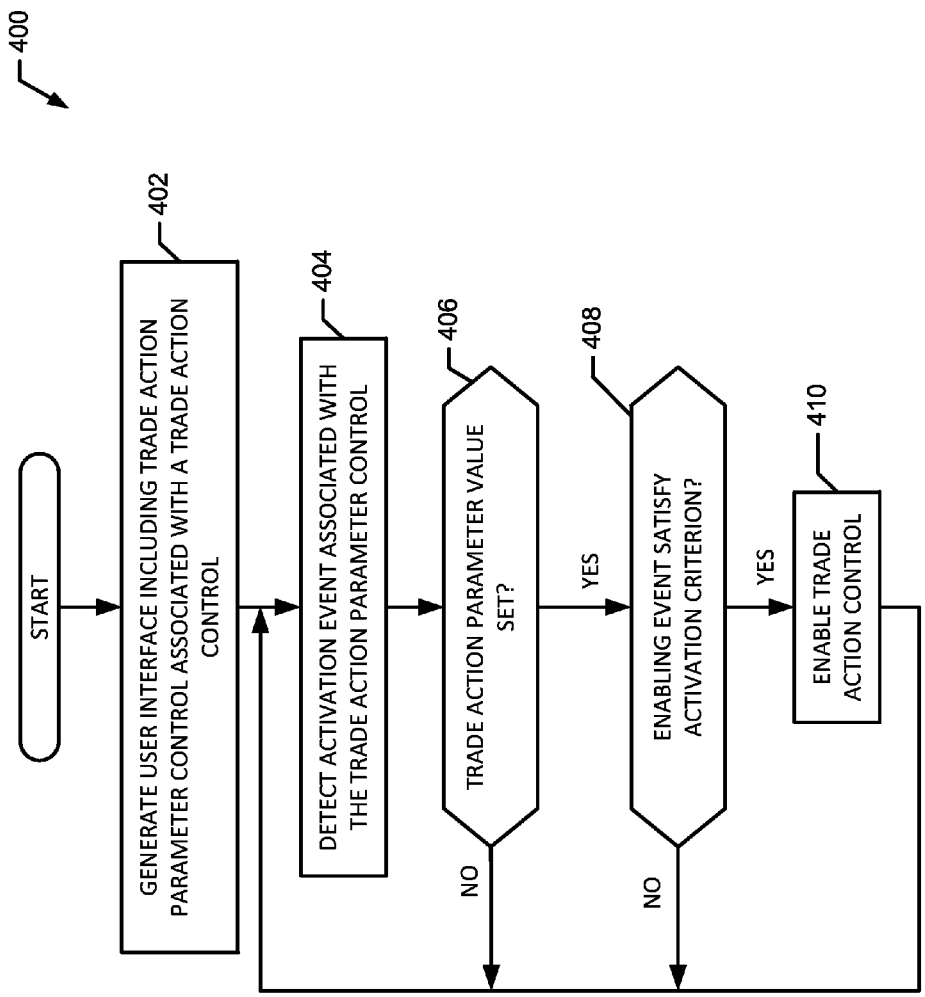
FIG. 4 illustrates a flow diagram representative of example machine readable instructions that may be executed to implement disclosed embodiments.

V. Example Systems and Methods for Spin-Gesture Based Trade Action Parameter Selection FIG. 4 is a flow diagram representative of example operations that can be executed to implement the teachings of this disclosure. The example operations of FIG. 4 can be implemented by, for example, the example trading device 110 of FIG. 1 and/or the example trading device 210a of FIG. 2. While the example trading device 110 of FIG. 1 is described as executing the example operations of FIG. 4 below, any suitable device can execute the examples operations of FIG. 4. The example operations of FIG. 4 implement spin-gesture based trade action parameter selection by enabling changing and selecting trade action parameter values via a spin-gesture across a user interface.

In the example of FIG. 4, a trading window may include a component that allows user interaction and another component that does not allow user interaction. That is, examples disclosed herein may facilitate selecting or setting a trade action parameter while also preventing execution of a corresponding trade action until an enabling event is detected. For example, a trading window may include a disabled trade action control such as a BUY control and an enabled trade action control such as a quantity control, a price level control, etc. In some such examples, executing a buy order may include enabling the BUY control and selecting the enabled BUY control. In some examples, enabling the BUY control includes setting a trade action parameter, such as a quantity, a price level, an order type, and/or an order limit, via, for example, a trade action parameter control and detecting an enabling event, such as holding the trade action parameter control.

The example process 400 of FIG. 4 begins at block 402 by generating a user interface including a trade action parameter control associated with a trade action control. FIG. 5a illustrates a portion of an example trading window 500 that includes an example quantity ("QTY") control 502 corresponding to setting a quantity value, an example selected value cell 504 corresponding to a currently selected quantity value and example interface cells 506, 508, 510, 512, 514, 518 corresponding to different quantity values.

At block 404, an activation event associated with the trade action parameter control is detected. In the illustrated example of FIG. 5a, the interface cells 506, 508, 510, 512, 514, 518 appear in the trading window 500 in response to selection of the QTY control 502. In some such examples, the interface cells 506, 508, 510, 512, 514, 518 may overlay on top of other user interface components and disappear when a quantity value is selected.

Figure 5B:
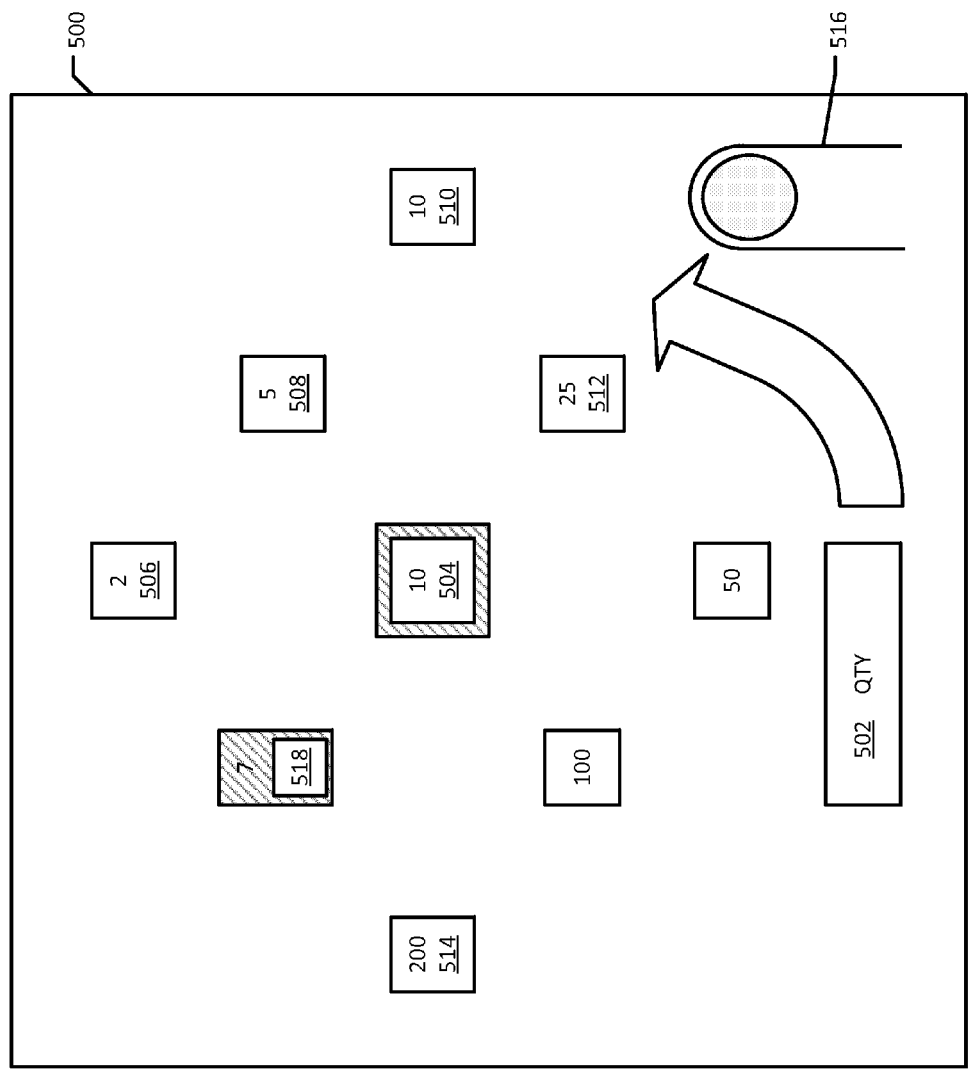

In the illustrated example of FIG. 5a, a sweeping motion, via, for example, a user finger 516, across the touch-screen rotates the values of the interface cells based on the direction of the gestural input. For example, sweeping in a counter-clockwise direction rotates the values of the interface cells 506, 508, 510, 512, 514 counter-clockwise as well. FIG. 5*b* illustrates the example trading window 500 in response to detected counter-clockwise sweep. In the illustrated example of FIG. 5*b*, the values of the interface cells 506, 508, 510, 512, 514 change to two, five, ten, twenty-five and two hundred, respectively. In the illustrated example, the selected value cell 504 corresponds to the value in an interface cell to the right of the selected value cell 504 (e.g., the example interface cell 510). Thus, a counter-clockwise sweeping gesture rotates the interface cell values counter-clockwise and the value displayed in the selected value cell 504 changes to ten. In contrast, a clockwise sweeping gesture rotates the values in the interface cells clockwise and the value displayed in the selected value cell 504 changes to two. In some examples, the sequence of values of the interface cells may be a linear sequence (e.g., five, ten, fifteen, etc.) or a non-linear sequence (e.g., two, five, ten, etc.). In some examples, the sequence of values may be set or selected by the user (e.g., a preset sequence).

In some examples, the value of the selected value cell 504 may change based on a selected interface cell. For example, in the illustrated example of FIG. 5*b*, a user may slide finger 516 to the interface cell 508 to change the value of the selected value cell 504 to five. In some such examples, a user may fix the location of one or more interface cell values. In the illustrated example of FIG. 5*b*, the quantity value seven is fixed to example interface cell 518. As a result, a counter-clockwise rotation changes the value of example interface cell 514 to two rather than to seven. Fixing the location of one or more interface cell values may be useful for common quantity values set by the user. For example, rather than rotating the interface cell values so the value seven appears in the interface cell 510 (and, as a result, in the selected value cell 504), the user can slide the finger 516 to the interface cell 518 to select the value seven.

In some examples, the values of the interface cells may loop around from one end of the sequence of values to the other end. For example, in the illustrated example of FIG. 5*b*, the value of example interface cell 518 may change from two-hundred to two based on a counter-clockwise sweep gesture. In some other examples, the values of the interface cells may not rotate when an end value reaches a specified interface cell. In the illustrated example of FIG. 5*b*, two-hundred is the last value in the sequence and a clockwise sweep gesture does not rotate the values of the interface cells any further.

In some examples, the number of values included in the sequence may be greater than the number of interface cells. For example, the sequence of values may include ten values in comparison to the eight interface cells included in the trading window 500. In some such examples, a sweeping gesture may cause different values to be displayed by the interface cells. In the illustrated example of FIGS. 5*a* and 5*b*, a counter-clockwise rotation of the values of the interface cells results in the value one no longer being displayed, while the interface cell 518 displays a previously non-displayed value (e.g., two-hundred). Although the example disclosed in FIGS. 5*a* and 5*b* describe selecting different trade action parameter values via a rotational sweeping motion, other techniques may be additionally or alternatively be used. For example, the sweeping motion may be linear.

At block 406, a determination is made whether the trade action parameter is set. In some examples, detecting an enabling event indicates the trade action parameter is set. In the illustrated example of FIG. 5*b*, holding the QTY control 502 is an enabling event. If no enabling event is detected, control returns to block 404 to detect an activation event associated with a trade action parameter control. Otherwise, control proceeds to block 408.

At block 408, a determination is made whether the detected enabling event satisfies one or more activation criterion associated with the trade action control. For example, an activation criterion for the BUY control may include holding the QTY control 502 for a period of time (e.g., two seconds). In response to the enabling event satisfying one or more activation criterion, at block 410, the trade action control is enabled. For example, the BUY control is enabled. Control then returns to block 404 to detect an activation event associated with a trade action control parameter.

Figure 6:
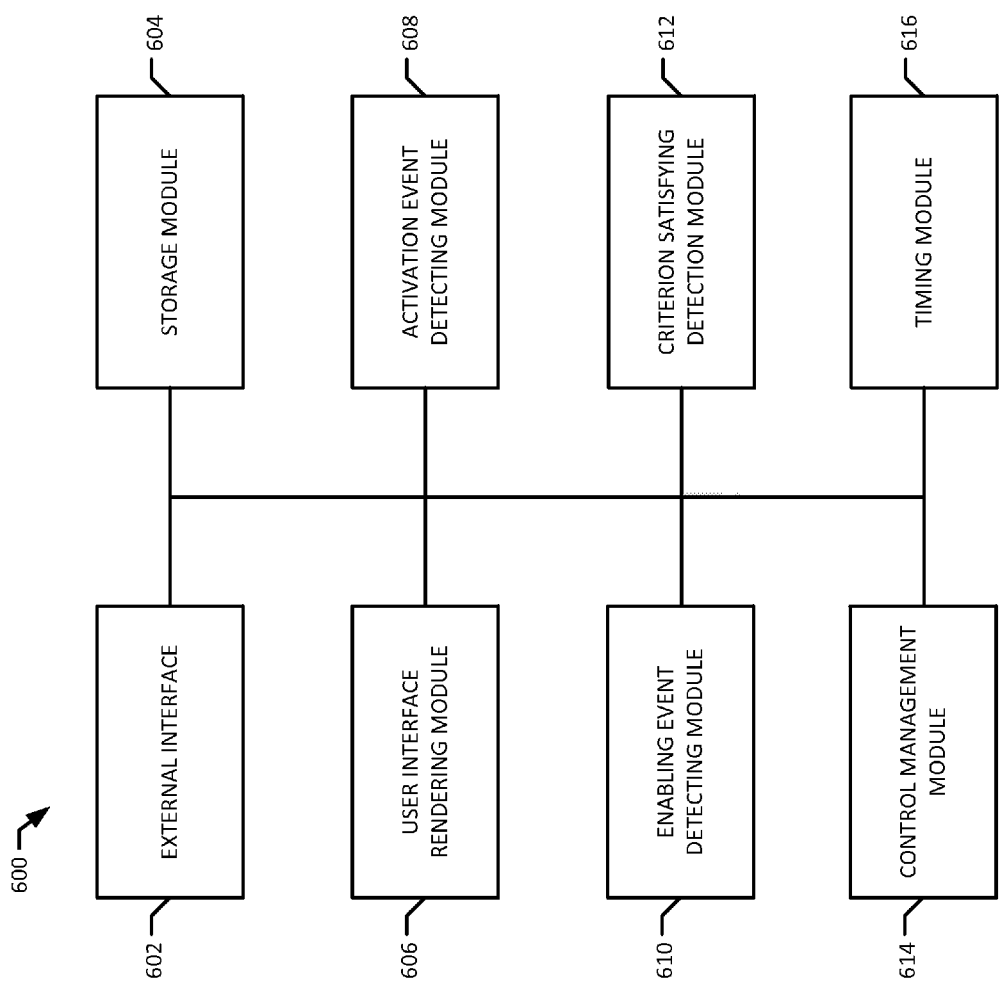
FIG. 6 illustrates a block diagram of an example system which may be employed with certain disclosed embodiments.

FIG. 6 is a block diagram of an example system 600 that may implement and/or execute the example operations of FIG. 4. In some examples, the system 600 may be implemented as part of software (or an application) associated with the trading device 110 of FIG. 1, the gateway 120 of FIG. 1 and/or the electronic exchange 130 of FIG. 1. In some examples, the system 600 may be implemented as computer implemented code or instructions operable independent of software associated with the trading device 110 of FIG. 1, the gateway 120 of FIG. 2 and/or the electronic exchange 130 of FIG. 1. In some examples, the features and functionality of the system 600 may be implemented in hardware operable in connection with the trading device 110 of FIG. 1, the gateway 120 of FIG. 1 and/or the electronic exchange 130 of FIG. 1.

The example system 600 of FIG. 6 includes an example external interface 602, an example storage module 604, an example user interface rendering module 606, an example activation event detecting module 608, an example enabling event detecting module 610, an example criterion satisfying detection module 612, an example control management module 614 and an example timing module 616. In some examples, the external interface 602 receives user input via, for example, the trading device 110 of FIG. 1. In some examples, the external interface 602 receives market information from, for example, the gateway 120 of FIG. 1, the electronic exchange 130 of FIG. 1 and/or an intermediary component. For example, market information updates may be communicated from the gateway 120 to the trading device 110. In some such examples, the external interface 602 of the example system 600 receives the market information updates and stores the full market information updates in an example storage module 604. The example storage module 604 may be implemented with any number and/or type(s) of tangible storage medium(s), memory(-ies), memory device(s) and/or memory disc(s). In some examples, the external interface 602 outputs information to display on a trading screen. For example, the external interface 602 may communicate to the trading screen what market information to display in a trading window.

The example user interface rendering module 606 of the example system 600 renders the displayed user interface. For example, the user interface rendering module 606 generates a user interface including one or more trade action controls for the trading window. In some examples, the user interface rendering module 606 updates a portion of the user interface. For example, the user interface rendering module 606 may change a trade action control from disabled to enabled or enabled to disabled. In addition, when market information is received via the external interface 602, the user interface rendering module 606 may update the relevant portions of the user interface.

The example activation event detecting module 608 of the example system 600 detects activation events based on user interactions detected on a touch-screen of the trading device 110. In some examples, activation events include directly or indirectly interacting with components, such as trade action controls, displayed in the trading window rendered by the user interface rendering module 606. In some examples, the activation event detecting module 608 identifies the gestural input (e.g., selecting, holding, swiping, scrubbing, sweeping, etc.) corresponding to the activation event. In some examples, the activation event detection module 608 may retrieve a sequence of values (e.g., a linear sequence of values, a non-linear sequence of values, a preset sequence of values, etc.) to display in interface cells from the storage module 604. In some such examples, the activation event detecting module 608 may send a message to the user interface rendering module 606 to update the values displayed in the interface cells based on the activation event (e.g., a clockwise rotating gesture, etc.) detected.

The example enabling event detecting module 610 of the example system 600 detects enabling events based on user interactions detected on the touch-screen of the trading device 110. In some examples, the enabling event detecting module 610 detects user interactions or gestural inputs similar to the example activation event detecting module 608. In the illustrated example of FIG. 6, the enabling event detecting module 610 sends a message including enabling event information to the example criterion satisfying detection module 612 in response to detecting an enabling event. Enabling event information may include, for example, a type of gestural input detected (e.g., a selecting, a holding, a sweeping, etc.), a duration the gestural input was detected, a portion of the trade action control covered by the gestural input, etc.

The example criterion satisfying detection module 612 of the example system 600 determines whether one or more activation criterion associated with the trade action control identified by the activation event detecting module 608 is satisfied based on the enabling event information received from the example enabling event detecting module 610. In some examples, the criterion satisfying detection module 612 may use a data structure such as a lookup table to identify the one or more activation criterion that apply to the information received from the activation event detecting module 608 and the enabling event detecting module 610. The criterion satisfying detection module 612 compares the results returned from the data structure to determine whether one or more activation criterion are satisfied. Based on the comparison, the criterion satisfying detection module 612 the information included in a message sent to the example control management module 614. For example, the information may include which trade action control was enabled or disabled.

The example control management module 614 manages the state of the one or more trade action controls included in the trading window. For example, the control management module 614 may store the state of the one or more trade action controls in a data structure. When a message is received from the example criterion satisfying detection module 612, the control management module 614 updates the status of the control. In some examples, the control management module 614 receives a message from the activation event detecting module 608 when an activation event is detected. In some such examples, the control management module 614 may determine whether the activation event information included in the message is a cancellation event for one or more of the trade action controls. For example, detecting a selection of a disabled trade action control may be ignored by the control management module 614. In some other examples, detecting a selection of an enabled trade action control may cause the control management module 614 to execute the trade action corresponding to the selected trade action control. In some other examples, detecting a non-enabled trade action control selection may cause the control management module 614 to change the status of the enabled trade action control to the disabled state. In some examples, the example control management module 614 may receive a timer expiration message from the example timing module 616. In some such examples, the control management module 614 may change the status of the corresponding enabled trade action control to the disabled state. The example timing module 616 of the illustrated example includes a clock, which may be initiated when, for example, a disabled trade action control is changed to an enabled trade action control. When the timer expires, the timing module 616 sends a message to the example control management module 614 to process.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method comprising:
generating, via an electronic processor on a display of a computing device, a user interface for providing data to a user and for receiving user inputs from the user, the user interface having a parameter control input displayed by the user interface, where the parameter control input is configured to receive gestural inputs for a trade action;
detecting, via the electronic processor, an activation event for the parameter control input, wherein the activation event is a first gestural input received via the parameter control input of the generated user interface;
determining, via the electronic processor, whether the activation event for the parameter control input satisfies at least one activation criterion;
in response to determining that the activation event satisfies the at least one activation criterion via the electronic processor, activating, via the electronic processor, the parameter control input, where the activated parameter control input is configured to receive a user input for a trade action parameter;
displaying, via the electronic processor on the user interface, a plurality of eligible values for the trade action parameter and a current value of the trade action parameter, the plurality of eligible values for the trade action parameter being displayed via the user interface in a relative sequence;
detecting, via the electronic processor, a second gestural input received via the parameter control input, the second gestural input defining a directional movement relative to the parameter control input and the displayed plurality of eligible values; and
in response to detecting the second gestural input, updating, via the electronic processor on the user interface, the current value of the trade action parameter, wherein the current value of the trade action parameter is updated according to the relative sequence based on the directional movement of the second gestural input.

2. The method of claim 1, wherein the relative sequence is customizable.

3. The method of claim 1, wherein the second gestural input causes the value of the trade action parameter to increase based on the sequence.

4. The method of claim 3, wherein the second gestural input causes the value of the trade action parameter to decrease based on the sequence.

5. The method of claim 1, further comprising detecting an enabling event associated with the parameter control input.

6. The method of claim 5, further comprising:
comparing the enabling event to an activation criterion; and
in response to the enabling event satisfying the activation criterion, updating the user interface to include an activated second parameter control.

7. The method of claim 6, wherein the activation criterion is a period of time.

8. The method of claim 6, wherein selecting the second parameter control initiates the trade action.

9. The method of claim 6, wherein selecting the second parameter control initiates the trade action including the value of the trade action parameter.

10. An apparatus comprising:
a display device configured to generate a user interface of a trading application, where the user interface receives user inputs from the user via a parameter control input configured to receive gestural inputs for a trade action, and where the user interface displays a plurality of eligible values for a trade action parameter and a current value of the trade action parameter, the plurality of eligible values for the trade action parameter being displayed in a relative sequence;
user input sensor coupled with the display device and configured to detect an activation event for the parameter control input, wherein the activation event is a first gestural input received via the parameter control input;
an electronic processor coupled with the display device and the user input sensor, where the electronic processor is configured to determine whether the activation event satisfies at least one activation criterion, and where, in response to determining that the activation event satisfies at least one activation criterion where the electronic processor is configured to cause the parameter control input to be activated to receive a user input for the trade action parameter,
where in response to receiving a second gestural input via the parameter control input, the electronic processor is configured to cause the display device to update a value of the current value of the trade action parameter according to a directional movement of the second gestural input, where the directional movement is detected by the user input sensor and is received relative to the parameter control input and the displayed plurality of eligible values.

11. The apparatus of claim 10, wherein the value of the trade action parameter is increased in response to the second gestural input.

12. The apparatus of claim 11, wherein the value of the trade action parameter is decreased in response to the second gestural input.

13. The apparatus of claim 10, where the user input sensor is further configured to detect an enabling event associated with the parameter control input and the electronic processor is further configured to compare the enabling event to an activation criterion.

14. The apparatus of claim 13, wherein a second parameter control is activated based on a determination that the parameter control input satisfies the activation criterion.

15. The apparatus of claim 14, further comprising a timing module de-activates the second parameter control after a period of time.

16. The apparatus of claim 13, where the trade action is executed based on the activation criterion comparison.

17. A tangible computer readable storage medium including computer program code to be executed by a processor, the computer program code, when executed, to implement a method comprising:
generating, via an electronic processor on a display of a computing device, a user interface for providing data to a user and for receiving user inputs from the user, the user interface having a parameter control input displayed by the user interface, where the parameter control input is configured to receive gestural inputs for a trade action;

detecting, via the electronic processor, an activation event for the parameter control input, wherein the activation event is a first gestural input received via the parameter control input of the generated user interface;

determining, via the electronic processor, whether the activation event for the parameter control input satisfies at least one activation criterion;

in response to determining that the activation event satisfies the at least one activation criterion via the electronic processor, activating, via the electronic processor, the parameter control input, where the activated parameter control input is configured to receive a user input for a trade action parameter;

displaying, via the electronic processor on the user interface, a plurality of eligible values for the trade action parameter and a current value of the trade action parameter, the plurality of eligible values for the trade action parameter being displayed via the user interface in a relative sequence;

detecting, via the electronic processor, a second gestural input received via the parameter control input, the second gestural input defining a directional movement relative to the parameter control input and the displayed plurality of eligible values; and in response to detecting the second gestural input, updating, via the electronic processor on the user interface, the current value of the trade action parameter, wherein the current value of the trade action parameter is updated according to the relative sequence based on the directional movement of the second gestural input.

18. The tangible computer readable storage medium of claim 17, further comprising detecting an enabling event associated with the parameter control input.

19. The tangible computer readable storage medium of claim 18, further comprising:

comparing the enabling event to an activation criterion; and in response to the enabling event satisfying the activation criterion, updating the user interface to include an activated second parameter control.

20. The tangible computer readable storage medium of claim 19, wherein the activation criterion is a period of time.

* * * * *